(No Model.)
E. WESTON.
ELECTRICAL MEASURING INSTRUMENT.
No. 480,894. Patented Aug. 16, 1892.
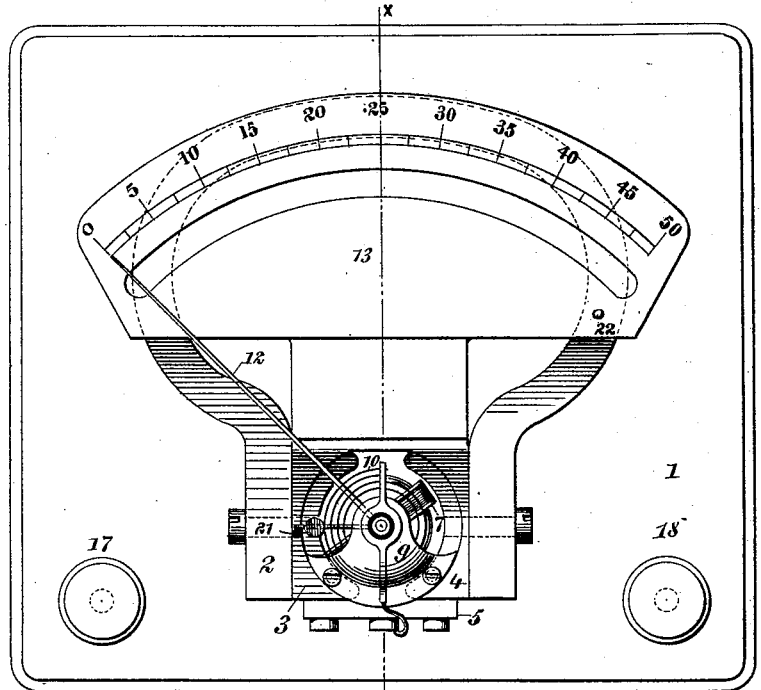
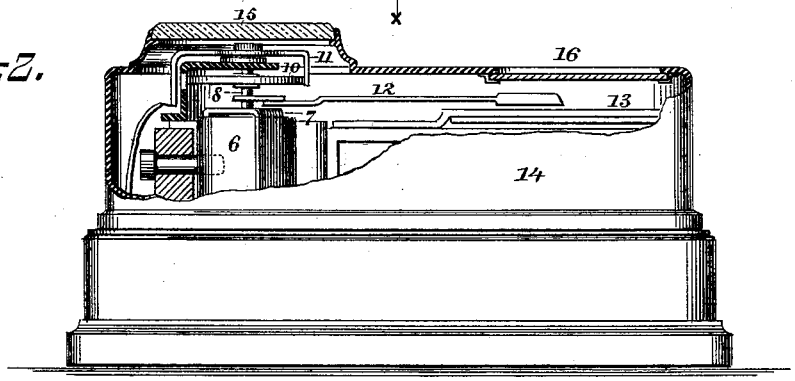
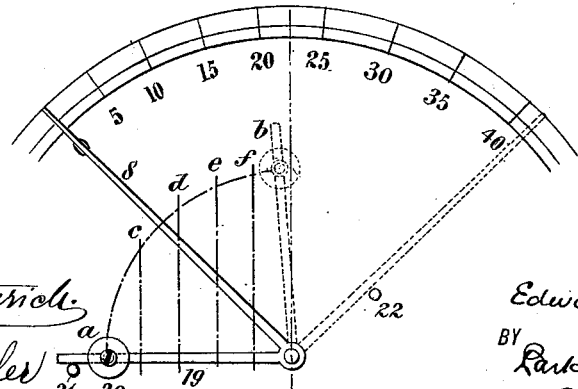
WITNESSES:
INVENTOR
Edward Weston
BY Park Benjamin
his ATTORNEY.

UNITED STATES PATENT OFFICE.

EDWARD WESTON, OF NEWARK, NEW JERSEY.

ELECTRICAL MEASURING-INSTRUMENT.

SPECIFICATION forming part of Letters Patent No. 480,894, dated August 16, 1892.

Application filed January 8, 1892. Serial No. 417,415. (No model.)

*To all whom it may concern:*

Be it known that I, EDWARD WESTON, of the city of Newark, county of Essex, and State of New Jersey, have invented a new and useful Improvement in Electrical Measuring-Instruments, of which the following is a specification.

My invention relates to a means for causing augmented deflections on the index of an electrical measuring-instrument for equal increments of moving force thereto applied; and it consists in the combination, with the index of said instrument, of a weighted arm which shall exert a constantly-decreasing leverage upon said index, and hence offer a constantly-decreasing resistance to its motion, so that if said index be actuated by equal force increments and opposed by decreased corresponding resistances it will constantly move over a proportionately-increased scale-distance for each added increment of force.

In the accompanying drawings, Figure 1 is a plan view of an instrument in which my present invention is embodied. Fig. 2 is a sectional view on the line X X, Fig. 1. Fig. 3 represents my invention apart from the instrument, but shown in connection with a scale and in part diagrammatically, in order to illustrate its operation.

Similar numbers of reference indicate like parts.

The instrument in which I show my present invention embodied is substantially the same construction as several other instruments of like character already patented to me—such, for example, as that shown and described in Letters Patent No. 392,386, dated November 6, 1888. A brief description of such instrument is therefore all that is here necessary.

1 is the supporting-base.

2 is a permanent magnet, on the inner face of the polar extremities of which are fastened concave pole-pieces 3 and 4. These pole-pieces are connected by a bar 5, which supports a solid cylinder 6 of magnetic material. There is therefore an annular space between the cylinder 6 and the inner concave face of the pole-pieces 3 and 4. Surrounding the cylinder 6 and extending through the annular space before mentioned is a coil 7, of insulated wire, which is supported on pivot-pins at each end, one of the said pivot-pins being shown at 8. The pivot-pins are journaled in caps, one of which is shown at 9, which are secured upon the edges of the pole-pieces 3 and 4. To one end of the pivot-pin 8 is fastened the extremity of a coil-spring 10. The other end of the coil-spring 10 is fastened to a bent arm which is pivoted above the cap. The operation and use of this coil-spring have been repeatedly described by me in prior patents—such, for example, as the one above mentioned.

On the pivot 8 is supported an index-needle 12, which extends over a scale 13, this scale being supported on the magnet.

The instrument is inclosed in a suitable case 14, and in the upper cover pieces of glass 15 and 16 are inserted to allow observation of the scale and also of the working parts of the instrument. The terminals of the coil 7 are connected with the binding-posts 17 and 18. When a current passes through the instrument, the coil turns on its pivot against the opposition of the spring and takes a new position dependent upon the difference of potential existing between the binding-posts 17 and 18. The extent of movement of the coil is shown by the index upon the scale.

I have constructed and sold a great many instruments of this kind adapted for use either as voltmeters or ammeters, and the same are now a standard in the market.

The object of my present invention is to increase the extent of index deflection for given increments of current, so that instead of the needle moving over an equal distance for each additional unit of current strength, for example, it will move over a constantly-increasing distance for each unit. By this arrangement, while at one end of the scale the needle in beginning its movement may show comparatively small deflections per unit of current when it has moved a certain distance over the scale and thence to the end of its path, it will give very much larger deflections. In this way and by this means slight variations in the current may become plainly and easily recognized. My invention for effecting this purpose is best shown in Fig. 3, and it consists in combining with the index-arm 8 a second arm 19, which may be attached to or formed integral therewith. Upon the index-arm 19 is a weight 20. The arm 19 normally rests against a stop 21, Fig. 3, when the needle is in the zero position. A second stop 22 extending upward from the scale-plate 13 prevents the needle-arm 8 and lever-arm 19 from moving beyond the position shown in dotted lines in Fig. 3.

Considering now the operation of my device, it will be obvious that when arm 19 stands in the position indicated in full lines, Fig. 3, then the weight 20 is in the position when it exerts the greatest leverage in opposition to the movement of the needle and that this opposing force is of course referred to the needle-pivot of a fulcrum. Now as the needle begins to move over its scale the weight describes the circular arc $a\,b$ and takes successively the positions $c\,d\,e\,f$; but it will be noticed that in each of these positions the leverage of the arm decreases, a greater proportion of the weight being thrown upon the fulcrum and a constantly-less proportion of it being exerted in opposition to the needle movement, until finally, when lever 19 assumes the position indicated by the dotted lines, practically the whole weight rests upon the fulcrum and none of it opposes the motion of the needle. If, then, the stop 22 were not present to prevent further motion of the needle the moment the lever 19 passed the position at right angles to that in which it is shown in full lines in Fig. 2, the weight would act with the needle to force it forward, and hence would throw the needle entirely off the scale. This is prevented by the stop 22.

Mathematically speaking, the resistance of the weight leverage to the movement of the needle decreases with the cosine of the angle assumed by the lever 19 in moving from its original position. It will be obvious from this that however much the needle may be impelled by equal force increment it will not meet a uniform resistance for each increment, but on the contrary a decreasing resistance. Hence for each added increment of force tending to move it, it will travel over a greater distance. Therefore, instead of moving over equal scale-divisions from the beginning to the end of its path, it will move over constantly-longer divisions, so that when the needle nears the end of its scale very slight variations in the force which impels it may be recognized by large movements of the needle over its scale.

I claim—

1. In an electrical measuring-instrument, in which for equally-applied force increment an index or pointer normally moves over equal scale-divisions, and a means of opposing a gradually-decreasing mechanical resistance to the forward movement of said index, and thereby allowing said index to move over gradually-increasing scale-divisions.

2. In an electrical measuring-instrument, a vibrating or rotating coil, a scale, an index or pointer actuated by said coil to move over said scale, and a means of opposing a gradually-decreasing mechanical resistance to the forward movement of said index.

3. In an electrical measuring-instrument, a vertically-disposed scale, a pivoted index or pointer moving over said scale, and an arm or lever rigidly connected to said index and extending at an angle thereto, the said arm and index being constructed and arranged so that said arm shall tend to assume a more nearly vertical position as said pointer moves forward over the scale.

4. In an electrical measuring-instrument, a vibrating or rotating coil, a vertically-disposed scale, a pivoted index or pointer actuated by said coil to move over said scale, and an arm or lever rigidly connected to said index and extending at an angle thereto, the said arm and index being constructed and arranged so that said arm shall tend to assume a more nearly vertical position as said pointer moves forward over the scale.

5. In an electrical measuring-instrument, a pivoted coil, a vertically-disposed scale, an index or pointer on said coil-pivot and moving over said scale, and an arm or lever rigidly connected to said coil-pivot and extending at an angle to said index, the said arm and index being constructed and arranged so that said arm shall tend to assume a more nearly vertical position as said pointer moves forward over the scale.

6. In an electrical measuring-instrument, a vibrating or rotating coil, a spring uniformly opposing the motion of said coil, a vertically-disposed scale, an index or pointer actuated by said coil to move over said scale, and an arm or lever rigidly connected to said index and extending at an angle thereto, the said arm and index being constructed and arranged so that said arm shall tend to assume a more nearly vertical position as said pointer moves forward over the scale.

7. In an electrical measuring-instrument, a vertically-disposed scale, a pivoted index or pointer moving over said scale, an arm or lever rigidly connected to said index and extending in a horizontal direction, and a stop whereon said arm normally rests, the said arm and index being constructed and arranged so that said arm shall tend to assume a more nearly vertical position as said pointer moves forward over the scale.

8. In an electrical measuring-instrument, a vertically-disposed scale, a pivoted index or pointer moving over said scale, an arm or lever rigidly connected to said index and extending at an angle thereto, and a stop for preventing said arm being carried past a vertical position, the said arm and index being constructed and arranged so that said arm shall become more nearly vertical as said pointer moves over the scale.

9. In an electrical measuring-instrument, the combination of the magnet 2, pivoted coil 7 in the field of said magnet, scale 13, index 12, and arm 19, extending at an angle to one another from said coil-pivot, and stops 21 22, limiting the movement of said index.

EDWARD WESTON.

Witnesses:
R. C. FESSENDEN,
H. R. MOLLER.